Dec. 9, 1969   P. L. TREMONT ET AL   3,482,697
WATER CONDITIONING SYSTEM
Filed Oct. 31, 1967   3 Sheets-Sheet 1

FIG. 1

INVENTORS
PETER L. TREMONT
PETER F. JACKSON
BY
*Robert J. Schaap*
ATTORNEY

Dec. 9, 1969  P. L. TREMONT ET AL  3,482,697
WATER CONDITIONING SYSTEM
Filed Oct. 31, 1967  3 Sheets-Sheet 2

INVENTORS
PETER L. TREMONT
PETER F. JACKSON
BY
*Robert J. Schaap*
ATTORNEY

United States Patent Office 3,482,697
Patented Dec. 9, 1969

3,482,697
WATER CONDITIONING SYSTEM
Peter L. Tremont, St. Louis, Mo., and Peter F. Jackson, Redwood City, Calif., assignors to Monsanto Company, St. Louis, Mo., a corporation of Delaware
Filed Oct. 31, 1967, Ser. No. 679,374
Int. Cl. B01d 15/04
U.S. Cl. 210—96          2 Claims

ABSTRACT OF THE DISCLOSURE

A water conditioning system which includes a regeneration tank, a water quality measuring device for detecting a condition when regeneration is necessary and automatically regenerating the ion exchange resin system. A turbidity meter measures the backwash turbidity and automatically terminates the backwash operation. Temperature and pressure controllers control the rinse operations. A programmer and regeneration logic circuit automatically controls the entire operation and is designed to control the plurality of water conditioning units so that not all units will be regenerated at the same time.

---

This invention relates in general to certain new and useful improvements in water conditioning systems, and more particularly, to a system and method for automatically conditioning water from the sensing of a certain degree of impurity.

Industrial water conditioning, often referred to as "water softening" or deionization, is a problem which has plagued industrial users of water for a long period of time. It is generally known that in many industrial processes, water must have a certain degree of "softness" and/or degree of purity. The particular treatment of the water necessary to prepare it for general use in a plant depends both on the substances carried by the water in suspension and solution and on the major uses to which the water will be put.

"Hard" water traditionally is water from which insoluable soap precipitates when a soluble sodium soap is added. The precipitate, in general, is a mixture of calcium and magnesium compounds and water is often referred to in terms of "hardness" considering the total concentration of calcium and magnesium ions. On the other hand, extensive salt content or total dissolved solids are often undesirable and these require partial or complete removal prior to use. Generally, the "softening" or deionization of water for industrial use is accomplished by four general major techniques such as evaporation, precipitation, ion exchange and sequestration. Evaporation has been used to produce substantially pure water generally for high pressure boilers and the like. However, this technique is rather expensive and has not been completely successful in removing all of the undesired impurities in the water. The precipitation technique is accomplished rather economically but generally poses a problem in that it is often times incomplete. Furthermore, it generally requires high temperature operation. The sequestration process is rather efficient, but requires the need of organic sequestrant or chelating agents such as sodium sol, ethylenediaminetetra acid which are quite costly for industrial applications when treating water in large quantities. The ion exchange system which generally employs natural and synthetic zeolite resins has been widely used and is quite effective. Furthermore, the zeolite resins can be readily regenerated by a relatively simple treatment so that the ion exchange system is capable of treating large quantities of water at a relatively low cost.

However, while the ion exchange technique for conditioning industrial water is one of the most satisfactory techniques, it does suffer many serious drawbacks which confront the user of industrial water. Often times, the employer of a water conditioning plant will only condition the water on a time basis. In other words, the service unit employing the water is generally shifted to another source of water or shut down until the conditioning can take place. This is performed after the water in question has been used for a certain period of time. However, the hardness of the water in the water supply often varies quite considerably and, therefore, it is not always necessary to regenerate the water on a specific time basis. Further, when the water is unusually hard, it may be necessary to condition the water more frequently. Accordingly, it has been necessary to conduct hardness tests periodically to determine when the water should be conditioned.

During the actual regeneration operation, it is necessary for a number of individuals to attend to the regeneration process since a number of problems often arise in the regeneration of the resins. The water temperature may vary to some extent and this will cause the ion exchange resin bed to expand. If the temperature is not closely controlled during the regeneration process, or if the amount of water passing through the bed is not controlled closely, it is possible to wash away a good portion of the expensive zeolite ion exchange resins. Furthermore, it is desirable to have some type of bed expansion and this must also be closely controlled. In addition, an insufficient bed expansion will create an insufficient regeneration. In the rinsing steps often employed in typical regeneration systems, the rinsing water must also be very carefully controlled so that the regeneration solution is actually flushed out of the resin bed rather than being thoroughly mixed with the water. These problems require very close control and constant supervision during the regeneration process which consumes a lot of nonproductive labor time and, therefore, is rather costly.

OBJECTS

It is, therefore, the primary object of the present invention to provide a water conditioning system which is capable of automatically sensing effluent quality of water and automatically initiate the regeneration cycle.

It is another object of the present invention to provide a system of the type stated which is capable of sensing each individual regeneration unit in a plurality of coacting units to determine which unit or units can be regenerated without jeopardizing the effluent output requirements.

It is an additional object of the present invention to provide a water conditioning system of the type stated which is completely automatic in its operation and performs all of the necessary regeneration steps automatically without the intervention of an attendant.

It is a further object of the present invention to provide a water conditioning system of the type stated which is adaptable for use under a wide variety of conditions and which can be used with a wide variety of commercially available regeneration compositions.

It is also an object of the present invention to provide a water conditioning system of the type stated which is highly efficient in its operation and is economical to manufacture and install.

With the above and other objects in view, our invention resides in the novel features of form, construction, arrangement, and combination of parts presently described and pointed out in the claims.

GENERAL DESCRIPTION

Generally described and without restriction upon the scope of the appended claims, the regeneration system of the present invention generally employs six major steps in the regeneration operation. Furthermore, the regeneration system of the present invention is capable of being used with a plurality of regenerating tanks which may be either connected in series or in parallel operation. In the typical ion exchange regeneration system, a tank employing an ion exchange resin bed is connected to the influent for receiving the water to be regenerated. The discharge of the tank is connected to an effluent or treated water line for employment in the industrial process. The effluent line is also connected to the sewer for discharge of the undesirable water from the regeneration process. A water hardness or water quality measurement meter is connected to the output line from the tank for determining the degree of hardness or quality of the water during the service portion of the operation. After the water reaches a certain degree of hardness or quality, the water hardness or other quality detection meter will create a signal for the control system to remove the particular purification unit from the service position and place the same in a regeneration position. However, the regeneration logic circuit acts to insure that only one unit is in regeneration at any one time.

A turbidity meter is also connected to the tank to determine the amount of the turbidity of the water which is flushed out of the upper end of the tank during the regeneration process. Various valves are employed to control the addition of the regenerating solution, and to control the addition of both fast and slow rinse operations. Each of these valves is connected to a programming device which is operated by a regeneration logic circuit.

The regeneration cycle consists of six main operations which include a backwash for adding wash water to the lower end of the tank and causing any foreign matter on the upper end of the ion exchange bed to be removed through the upper end of the bank. When a sufficient amount of the foreign matter has been removed, as determined by the turbidity meter, the backwash operation ceases. Thereafter, a regeneration solution, such as a salt solution, acid solution or caustic solution depending on the type of acid employed, is added to the upper end of the tank and permitted to react with the ion exchange resin for a regeneration of the same. After a sufficient amount of the regeneration solution has been added to the tank, a slow rinse is performed in order to wash the regeneration solution from the exchange resin. This expended regeneration solution is then discharged to a sewer line or waste collection system. After the slow rinse has been performed, a first fast rinse is next performed where any remaining traces of the regeneration solution are washed from the ion exchange bed. Thereafter, a second fast rinse is employed and this solution is then returned to the influent line until the water reaches a desired state of purification where it is switched to the effluent line for use in the industrial process. Each of the above steps is accomplished automatically through the programmer and regeneration logic circuit employed.

In the accompanying drawings: (3 sheets)

FIGURES

FIGURE 1 is a schematic view illustrating a water regeneration system which is constructed in accordance with and embodies the present invention;

DETAILED DESCRIPTION

Figure 2:
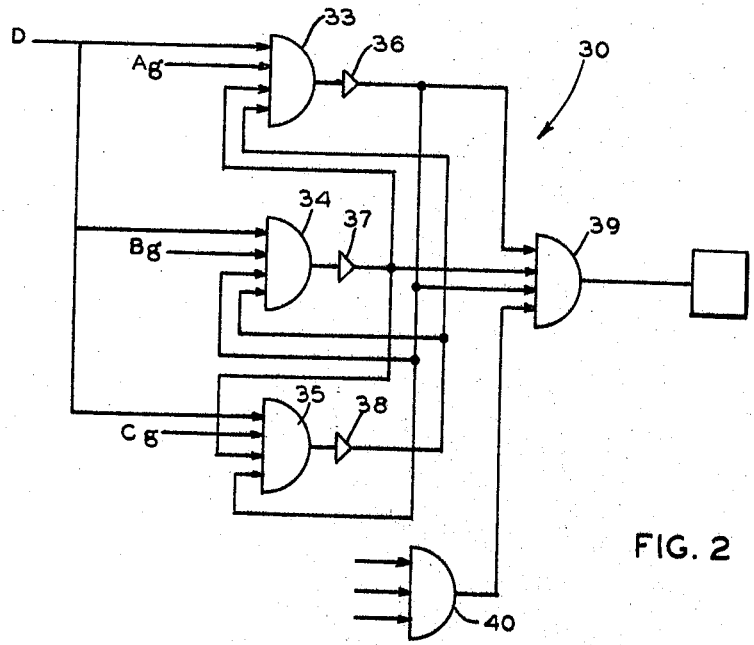
FIGURE 2 is a schematic illustration of a regeneration logic circuit forming part of the control system of the present invention.

Referring now in more detail and by reference characters to the drawings which illustrate a preferred embodiment of the present invention, A designates a water purification system for the softening of or salt removal from water or so-called "purification" system to be used in industrial processes. The water softening or purification system A generally comprises one or more regeneration tanks, $T_1$, $T_2$ and $T_3$ as illustrated in FIGURE 1, and which are often referred to in the art as "Clarifier Units." Since the three regeneration tanks, $T_1$, $T_2$ and $T_3$ are all identical, and the associated apparatus are similarly identical, only one regeneration tank $T_1$ will be described in detail herein.

Each of the tanks $T_1$, $T_2$ and $T_3$ is provided with an inlet line 1 which is in turn connected to an influent line 2, the latter carrying a suitable source of water to be deionized or softened. Each of the tanks $T_1$, $T_2$ and $T_3$ is also provided with a discharge line 3 which are in turn connected to an effluent line 4 which is in turn connected to the industrial process or to a surge tank (not shown), or any other system for collection of the purified water. The individual process in which the softened water is employed does not in any way form part of the present invention and is, therefore, neither illustrated nor described in detail herein. Furthermore, while only three tanks are illustrated in FIGURE 1, it should be recognized that any number of regeneration tanks may be employed in this system. Furthermore, the tanks may be connected to the effluent lines and influent lines in a series relationship as opposed to a parallel relationship as illustrated.

Each of the regeneration tanks $T_1$, $T_2$ and $T_3$ is provided with an ion exchange resin 5 often referred to as a "bed," and generally includes a synthetic inorganic zeolite resin. In general operation, the ion exchangers give up an ion from their structure for another in the solution that is being treated. The zeolite resins which are most often employed are capable of undergoing reversible base-exchange reactions. In the solid particle of exchange material charged with sodium, hydrogen or hydroxyl ions by contact with a solution of appropriate regenerant, cations or anions are replaced by the ions to be removed. For example, sodium ions can be replaced by calcium and magnesium ions by contacting an exchange material with an ordinary salt solution. When the ion-exchange resin capacity has been exhausted it is then regenerated most often by a regenerant solution which is described in detail hereinafter. This cycle of exchange and regeneration of the ion exchange resin can be repeated indefinitely if the exchange resin bed 5 is not fouled with organic slimes, oxidized iron or other similar silts or precipitates of various carbonates or sulphates. The general equation of the reactions occurring in the ion exchange processes for (1) softening, (2) cation removal, or (3) anion removal can be illustrated as follows:

(1) Softening—Letting $Z$=zeolite

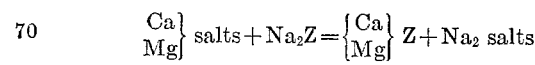

(2) Cation removal

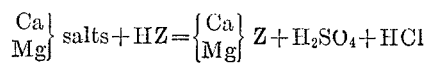

(3) Anion removal $$H_2SO_4 + HCl + ZOH = \begin{Bmatrix} SO_4 \\ Cl \end{Bmatrix} Z + H_2O$$

In the regeneration process, the reversible regeneration reactions for each of the above ion exchange processes can be represented as follows:

(1) $\begin{Bmatrix} Ca \\ Mg \end{Bmatrix} Z + 2NaCl = Na_2Z + \begin{Bmatrix} Ca \\ Mg \end{Bmatrix} Cl_2$ (2) $\begin{Bmatrix} Ca \\ Mg \end{Bmatrix} Z + H_2SO_4 \text{ or } HCl = H \cdot Z + \begin{Bmatrix} Ca \\ Mg \end{Bmatrix} SO_4 \text{ or } Cl$ (3) $\begin{Bmatrix} SO_4 \\ Cl \end{Bmatrix} Z + NaOH = Na \begin{Bmatrix} Cl \\ SO_4 \end{Bmatrix} + ZOH$ The bed of ion exchange resin 5 usually fills only one-fourth to one-third and certainly no more than 50% of the volume of the tank. Generally, a preferred ion exchange resin height in an 8 foot tank would be 2 feet to 2½ feet. This in turn leaves an unfilled volume or so-called "free board" of approximately 5½ feet.

Operatively interposed in the discharge line 3 is a quality meter, and more specifically for the purposes of this embodiment of the invention, a water-hardness meter or so-called "analyzer" 6. The meter 6 is connected to the discharge line 3 by means of a conduit 7. Also interposed in the discharge line 3 in downstream relation to the water-hardness analyzer 6 is a conventional solenoid valve 8. The water-hardness analyzer 6 may be of the type commercially available under the trademark Testomat and described in the Calgon Corporation bulletins B–6901. The type of water-hardness analyzer in the present invention should be an automatic, intermittent analyzer which will sample a continuously flowing stream or an intermittently flowing stream at regular intervals or at an operator's option. The water-hardness analyzer 6 of the present invention is designed to initiate and transmit a corrective signal responsive to a certain degree of water quality such as water hardness. Therefore, when the water passing through the tank $T_1$ and through the ion exchange resin bed 5 exceeds a certain specified limited hardness or quality as set on the analyzer 6, the analyzer 6 will initiate a control signal in a manner more fully described in detail hereinafter.

A conventional solenoid operated valve 9 is also interposed in the inlet line 1 in the manner as illustrated in FIGURE 1. Connected across the inlet line in the discharge line 3 of each of the tanks $T_1$, $T_2$ and $T_3$ are by-pass lines or so-called "backwash lines" 10. The backwash line 10 is connected at a point above the solenoid valve 9 in the inlet line 1 and is connected at a point intermediate the conduit 7 and the solenoid valve 8 in the discharge line 3, all in the manner as illustrated in FIGURE 1. The bypass line 10 is also conventionally provided with a solenoid valve 11. A pressure controller 12 is also connected to each of the backwash lines 10 for controlling the water pressure entering each of the regeneration tanks $T_1$–$T_3$ through the discharge line 3. The pressure controller 12 is actually designed to control the flow rate of water in the backwash operation which is hereinafter described in more detail and includes an orifice for measuring pressure differential. The pressure controller 12 is generally designed to operate in excess of a pressure of 30 lbs. per square inch. If the pressure drops below this particular setting, the controller will call for more liquid flow into the tanks $T_1$–$T_3$. Also connected to the backwash line 10 is a temperature controller 13 which functions as a temperature sensor. The temperature sensor controller 13 operates in conjunction with the pressure controller 12 and the two determine the amount of the flow into the tanks $T_1$–$T_3$ during the backwash operation since pressure and temperature are an important function of the amount of flow in backwash operations. This relationship will also be discussed more fully in detail hereinafter.

Also connected to the inlet line 1 but in downstream relationship to the solenoid valve 9 is a backwash discharge line 14 which is also provided with a conventional solenoid valve 15 in a manner as illustrated in FIGURE 1. Connected to the backwash discharge line 14 in downstream relationship to the solenoid valve 15 is a turbidity meter 16 which is designed to measure the turbidity of the backwash water flowing out of the upper end of each of the tanks $T_1$–$T_3$. The lower end of the backwash discharge line 14 is connected to a sewer line 17, the latter of which is in turn capable of discharging into some suitable source for depositing the spent water.

Connected to the inlet line 1 in downstream relationship to the solenoid valve 9 and in upstream relationship to the backwash discharge line 14 is a regenerant supply line 18 which is connected to a regenerant tank 19, the latter preferably being filled with a liquid brine. A regenerant level controller 20 is also connected to the outlet of the regenerant tank 19 and interposed in the regenerant supply line 18 in downstream relationship to the regenerant level controller 20 is a solenoid valve 21. The liquid regenerant from the regenerant tank 19 is designed to flow through the supply line 18 when the valve 21 is open and into each of the tanks $T_1$, $T_2$ and $T_3$. For regeneration of the ion exchange resin according to the chemical reactions as set forth above. While a separate regenerant tank 19 with a separate regenerant level controller 20 is illustrated as being for each individual tank, it should be understood that one regenerant tank 19 and one regenerant level controller 20 can be supplied and connected to each of the tanks $T_1$, $T_2$ and $T_3$. However, in this latter event, a separate solenoid valve 21 would be interposed in each of the regenerant supply lines 18 leading to each of the tanks $T_1$–$T_3$.

A regenerant discharge line 22 is connected to the tank discharge line in upstream relationship to the solenoid valve 8 and is connected at its other end to the backwash discharge line 14 for ultimate disposal of the regenerant solution to the sewer line 17. A solenoid valve 23 is interposed in the regenerant discharge line 22 in the manner as illustrated in FIGURE 1. Also connected to the regenerant discharge line 22 between the two solenoid valves 8 and 23 is a recovery line 24 which is in turn connected to a clarifier input line 25. A conventional solenoid valve 26 is interposed in the recovery line 24 in the manner as illustrated in FIGURE 1. The clarifier input line 25 is preferably recycled back to the source from which the water in the influent line 2 is obtained.

The water regeneration system A of the present invention can be operated either manually or automatically by means of the programming device and automatic control circuit hereinafter described in more detail. In the manual operation, as well as in the automatic operation, the regeneration cycle includes six basic operations which are set forth below:

(1) A backwash operation
(2) Resin regeneration operation
(3) A slow rinse
(4) A first fast rinse
(5) A second fast rinse
(6) A return to the service position.

Normally, each of the regeneration tanks, $T_1$, $T_2$ and $T_3$ is in the service position, that is where they are being used to regenerate the water from the influent line 2. In the service position, the valve 9 and the solenoid valve 8 are in the open position permitting water from the influent line 2 to pass into the inlet line 1, and into the tank $T_1$. The water passing through the bed 5 of ion exchange resin will become softened and hence passed outwardly through the discharge line 3 into the effluent line 4. The water which passes into the effluent line 4 is then used in the industrial operation, the latter being neither illustrated nor described herein. It is to be noted that the solenoid control valves 11, 23 and 26 are closed when the tank $T_1$ is in the service position. In like manner, the valves 15 and 21 are in the closed position. However, it is to be noted that the water quality analyzer 6 is periodically analyzing the water passing through the discharge line 3 to determine the quality thereof. If the hardness remains below a preselected limit, then the regeneration tank $T_1$ will always remain in the service position. However, if the water hardness analyzer 6 should detect a hardness of water which exceeds the predetermined limit, then the water hardness analyzer 6 will generate a control signal. The control signal in the case of manual operation will be designed to advise an attendant of the water and hence of the ion exchange resin bed 5. It is to be noted that all of the units in the service position will operate in like manner. Furthermore, it is to be noted that at least one unit is generally designed to remain in the service position so that the industrial operation is not shut down for lack of water. Accordingly, if the regeneration tanks $T_2$ and $T_3$ were in a regeneration cycle, that the tank $T_1$ must remain in the service position.

In order to regenerate the resin bed 5, the backwash operation is commenced. The backwash operation is designed to clear the resin bed of any foreign matter disposed thereon. In the backwash operation, the valve 9 is moved to the closed position, thereby causing the water from the influent line 2 to pass through the backwash line 10. The valve 11 is then opened and the valves 8, 26 and 23 remain in the closed position. Furthermore, the valve 15 is opened so that the backwash water will pass through the backwash line 14. Since the backwash operation is designed to remove the foreign matter which is accumulated generally on the upper surface of the bed 5, the backwash water which passes through the line 14 is then discharged to the sewer line 17.

In the backwash operation, the exchange resin bed 5 should be expanded to approximately 60% of its original volume. Generally an expansion of 100% or greater will cause the loss of the rather valuable exchange resin. Furthermore, the backwash operation is considerably affected by flow rates and flow rates are in turn a direct function of pressure and temperature perimeters. If the bed expansion does not achieve at least 50%, some packing will exist and accordingly, an insufficient backwash can occur. Furthermore, the backwash must be continued for a minimum of three to four minutes for allowance of bed expansion. Generally, five minutes or more is desirable. Often times an even greater amount of time is necessary, depending upon the amount of foreign matter which has accumulated within the bed 5. Accordingly, the amount of turbidity present in the bed can be determined by analysis of the water passing through the backwash discharge line 14 and this can be determined by the turbidity meter 16. If the backwash operation is not completed so that all practical or foreign matter is removed, then the resin exchange bed 5 cannot be sufficiently regenerated and the exchange capabilities of the resin are substantially reduced.

Figure 4:
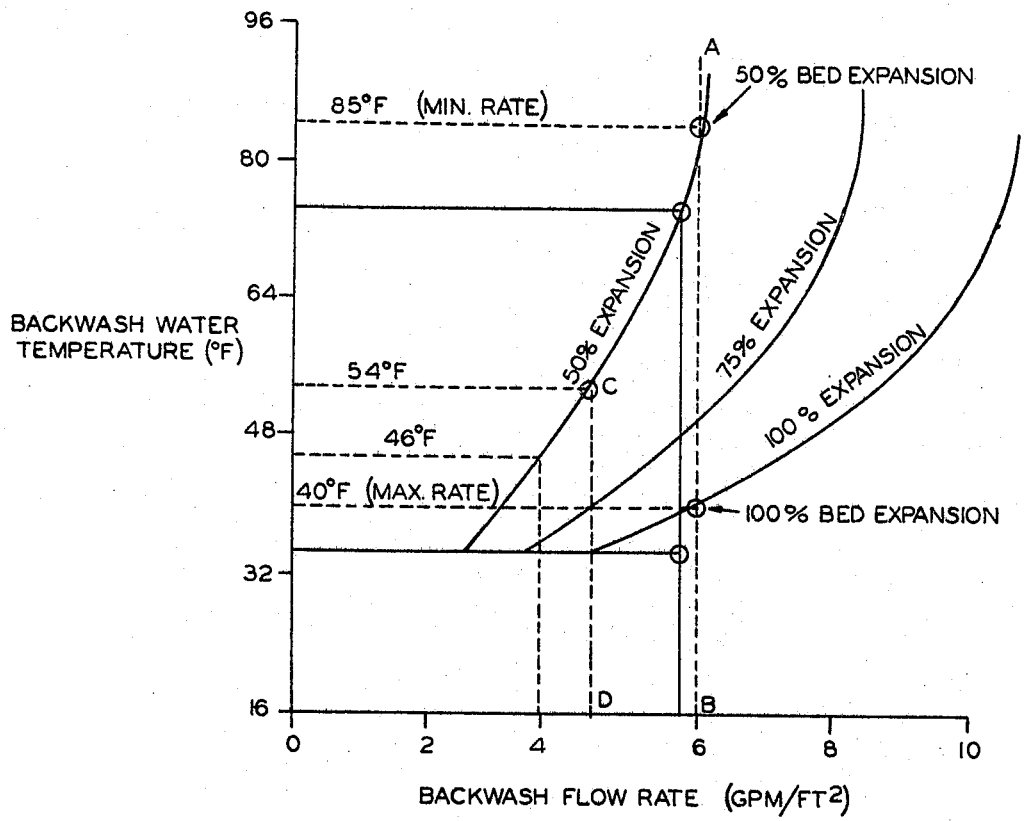
FIGURE 4 is a schematic view showing the backwash water temperature as a function of backwash flow rate on the bed regenerate.

The effect of the backwash flow rate as a function of temperature and bed expansion is more fully illustrated in FIGURE 4. In this figure, it can be seen that the backwash flow rate is plotted as a function of the backwash temperature in 0° F. Similarly, a series of expansion curves for 50% expansion, 75% expansion and 100% expansion of the ion exchange resin bed is also plotted. The line A–B presents a flow rate of approximately 6 gallons per minute. Intersection of this line at a temperature of 40° indicates a bed expansion of 90%. Furthermore, intersection of the same line A–B at a temperature of 85° indicates a bed expansion of 50%. However, it is to be noted that if the flow rate was decreased approximately 4.5 gallons per minute, and the temperature was raised to 54°, only the minimum expansion of 50% would be attained. It can also be seen that if the temperature were increased at this flow rate beyond 54° that an insufficient expansion would result. As indicated previously, the flow rate is a definite function of the pressure of the water. Accordingly, the pressure controller 12 is designed to obviate problems of pressure differential in the influent line 2. In many industrial plants, the temperature of the influent water may range as much as 35 to 85° F. and this variation in temperature of the influent water naturally materially affects the backwash operation. By employment of the temperature controller 13 and the pressure controller 12, it is possible to maintain a relatively constant flow rate of water at a relatively constant temperature. Furthermore, the employment of the turbidity meter 16 provides an accurate way in determining when the backwash operation has been completed.

After the backwash operation is completed, the bed regeneration operation takes place. The turbidity meter 16 will generate a sufficient signal to the control system hereinafter described to close the valves 11 and 15 in order to stop the flow of backwash water. The valve 21 will then be shifted to the open position when the valve 23 leading to the discharge line 14 and sewer line 17 will also be open. The regenerant solution from the charge tank 19 is then pumped through the line 18 into the tank $T_1$. If the resin bed 5 is a zeolite resin, the regeneration solution is generally sodium chloride, acids or various bases, causing a regeneration of the resin in the manner as previously described. This regeneration of the resin will cause removal of both the calcium and magnesium ions in the form of calcium chloride and magnesium chloride or the removal of cations and anions as previously described. The regenerate solution will then pass through the discharge line 14 into the sewer line 17. A timer in the control system hereinafter described will regulate the amount of regenerate solution which is pumped into the tank $T_1$. After a predetermined time, the solenoid valve 21 and the solenoid valve 23 will close.

The signals closing the solenoid valves 21, 23 will also initiate the slow rinse cycle by opening the valve 9 and the valve 23. Water from the influent line 2 will pass through the valve 9, through the inlet line 1 and into the tank $T_1$ for washing the regenerate solution out of the tank $T_1$. The water will pass through the line 22, the discharge line 14 and into the sewer. The slow run cycle is also a timed cycle. However, after a predetermined time and after detection of the hardness or quality of the water passing therethrough, the slow rinse cycle is changed to a fast rinse cycle. In the first fast rinse cycle, the valve positions remain the same as in the slow rinse cycle. However, when the hardness or quality of the water as determined by the water quality meter 6 is no greater than the average hardness or quality of the water in the influent line 2, the water quality meter 6 will cause the control system to generate a signal closing the valve 23 and opening the valve 26. Water passing through the tank $T_1$ will then be returned to the clarifier input line 25 for reuse in the water system.

In essence, the slow rinse cycle is designed to remove the regenerate solution which is in the bed 5 of the tank $T_1$. The slow rinse is basically designed to slowly force the regenerate solution out of the bottom of the tank $T_1$. An initial fast rinse would cause a frothing of the regenerate solution and would prevent complete removal of the regenerate solution. The fast rinse follows the slow rinse and is designed to remove any of the remaining portions of the regenerate solution which might be entrained in the beds. The second fast rinse is a continuation of the first fast rinse cycle and only involves the closing of the valve 23 and opening of the valve 26 to reuse the water from the tank $T_1$ when it has reached a water hardness level or quality no greater than the water in the influent line 2.

The second fast rinse cycle is also controlled by a timer in the control circuit to be hereinafter described. After the second fast rinse cycle has been completed, the valve 26 is closed and the valve 8 is opened. At this point, the tank $T_1$ is then in the on-stream position.

The status of the valves in the regeneration cycle is more fully illustrated in the following table. As indicated below, X's represent the valves being in the open condition for the various cycles forming part of the regeneration procedure. The valve is in the closed position where an X does not appear in the particular valve position.

VALVE STATUS TABLE

| Valve | In Service | Back-wash | Bed Regen. | Slow Rinse | Fast Rinse 1 | Fast Rinse 2 |
|---|---|---|---|---|---|---|
| 9 | X |  |  | X | X | X |
| 21 |  |  | X |  |  |  |
| 23 |  |  | X | X | X |  |
| 8 | X |  |  |  |  |  |
| 15 |  | X |  |  |  |  |
| 26 |  |  |  |  |  | X |
| 11 |  | X |  |  |  |  |

CONTROL SYSTEM

Figure 3:
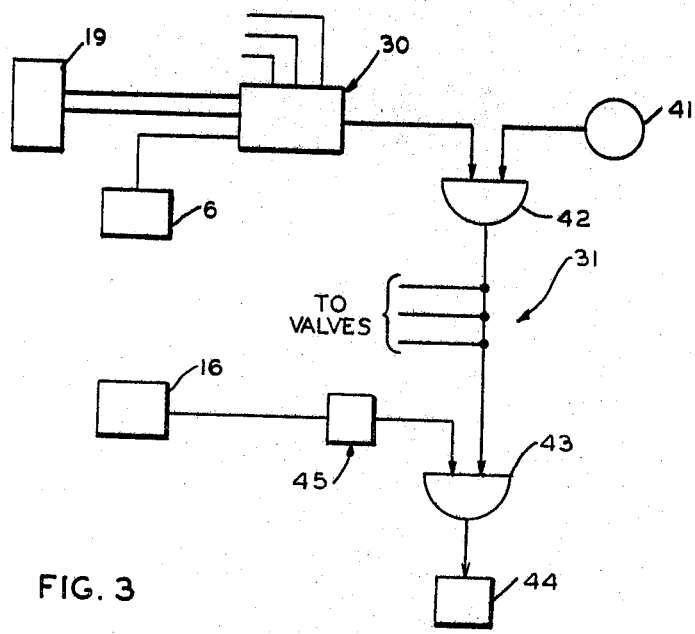
FIGURE 3 is a schematic view of a control programmer forming part of the logic circuit of FIGURE 2.

The control system which operates the regeneration system previously described is more fully illustrated in FIGURES 2 and 3. The control system generally includes a control logic circuit 30, and a programmer 31. For purposes of clarity, the details of construction of the various circuits have not been included, except in schematic form, inasmuch as the various components per se forming part of the control logic circuit 30 and the programmer 31 are conventional. The control system also includes a conventional flow controller 32.

The control logic circuit 30 comprises three AND gates 33, 34, 35, each of which is provided on its output with a conventional inverter 36, 37, 38 respectively. The outputs from the three inverters 36, 37, 38 are, in turn, connected to the inputs of an AND gate 39 in the manner as illustrated in FIGURE 2. The control logic circuit 30 also includes an OR gate 40 which is provided with three inputs connected to the water quality meter 6 of each of the tanks $T_1$, $T_2$ and $T_3$. The output of the OR gate 40 is, in turn, connected to the AND gate 39, which serves as a summating gate. The output of the AND gate 39 is, in turn, connected to a conventional sequencer. This sequencer is in the form of a rotary switch which is a type of detector for determining the water quality of the outputs of each of the tanks $T_1$, $T_2$ and $T_3$. In essence, when the water hardness or quality on the output of each of the tanks reaches a predetermined level, the sequencer will determine the next tank to be placed in a regeneration condition.

Each of the AND gates 33, 34, 35 also have one input line connected to each of the water quality meters 6 of each of the tanks $T_1$, $T_2$, $T_3$, and receive signals from these tanks designated as $A_g$, $B_g$, $C_g$ in the manner as illustrated in FIGURE 2. Each of the AND gates 33, 34, 35 has an input connected to the regenerate level controller 20. Furthermore, the output from the inverters 36, 37, 38 from each of the AND gates 33, 34, 35 are in turn connected to inputs of the two remaining AND gates. For example, the output of the gate 33 through the inverter 36 is conneced to the inputs of the gates 34 and 35.

If the regenerate level control 20 provided a signal represented as D, the following conditions would exist for regeneration.

$$R_A = D(A_g \overline{R}_b \overline{R}_c)$$

$$R_B = D(B_g \overline{R}_a \overline{R}_c)$$

$$R_C = D(C_g \overline{R}_a \overline{R}_b)$$

A, B and C in essence will represent setpoint signals from the various water hardness or quality monitors. For initiation of regeneration, the following conditions would exist.

$$R_{start} = (\overline{R}_a \overline{R}_b \overline{R}_c)(A_g + B_g + C_g)$$

The flow controller 32 is electrically connected to both the temperature controller 13 and the pressure controller 12 and receives analogue signals therefrom. In addition, the water hardness meter 6 of each of the tanks T is electrically connected to the control logic circuit 30 and transmits analogue signals thereto. The temperature controller 13 and the pressure controller 12 are, in turn, electrically connected to the flow controller 32 which, in turn, is electrically connected to and operates a flow control valve 50 operatively interposed in the inlet line 1. It should be recognized that a flow control valve 50 is interposed in each of the inlet lines 1 leading to each of the tanks T.

The logic circuit 30 is in turn electrically connected to the programmer 31, the latter including a conventional timer 41 which is connected to a summing gate 42. The summing gate 42 is also connected to a program advance gate 43, which is in turn connected to a program advance mechanism 44. Also connected to the program advance gate 43 is an analogue logic trigger circuit 45 which is connected to the turbidity meter 16 associated with each of the tanks T. The turbidity meter receives an analogue signal. The analogue logic trigger circuit 45 receives an analogue signal from the turbidity meter 16 and advances an electrical signal to the program advance gate 43. In addition, the output of the summing gate 42 is connected to each of the solenoid valves associated with each of the tanks. The programmer is designed to open and close the respective valve in accordance with the operations previously set forth.

The following table illustrates the various steps performed in the regeneration cycle, the influent, the effluent, the element of control and the various control parameters affecting each of the steps.

REGENERATION CYCLE

| | Influent | Effluent | Control | Control Parameters |
|---|---|---|---|---|
| Backwash | Main Water | Sewer | Timer and Turbidity Meter | (G.p.m./ft.²), Time Density, Turbidity, ΔP Across Bed. |
| Regeneration | Regenerate Solution | | Timer | Quantity of Resin in Bed. |
| Slow Rinse | Main Water | Sewer | Timer | Quantity of Regenerate to be dispensed. |
| Fast Rinse | Main Water | Sewer | Water Quality Detector and Timer. | Hardness (p.p.m.) or Conductivity (Mho). |
| Return to Service | Main Water | Service Mains | Flow Meter | From volumes of Water Processed. |

It should be understood that changes and modifications in the form, construction, arrangement and combination of parts presently described and pointed out may be made and substituted for those herein shown without departing from the nature and principle of our invention.

Having thus described our invention, what we desire to claim and secure by Letters Patent is:

1. A system for reactivating a regeneratable liquid purification medium, said system comprising a tank holding said medium and for passing said liquid therethrough, effluent quality detection means for measuring the hardness of liquid passing through said tank and for generating a signal to initiate regeneration when the effluent quality exceeds a predetermined limit, means introducing a backwash into said medium for backwashing said medium until the backwash achieves a predetermined limit, a turbidity meter measuring the turbidity of said backwash and generating a signal to cease said backwash at a predetermined turbidity level, means for measuring the temperature and pressure of said backwash and automatically adjusting the flow rate thereof accordingly, means for adding a medium regenerate to said tank for regenerating said medium, rinsing means including a slow rinsing operation for rinsing said regenerate from said tank and a first fast rinse operation following said slow rinse operation and a second fast rinse operation following said first fast rinse operation in time related sequences, means operatively associated with said effluent quality detection means for stopping said first fast rinse operation and automatically initiating said second fast rinse operation when the quality of a rinse solution passing through said tank reaches a predetermined limit, and control means for automatically initiating each of the aforementioned operations in time related sequences.

2. A system for reactivating a regeneratable liquid purification medium, said system comprising a plurality of tanks, each of which contains said medium for passing said liquid therethrough, effluent quality detection means for measuring an impurity parameter of liquid passing through each said tank and for generating a signal to initiate regeneration when the effluent quality of any tank exceeds a predetermined limit, means for backwashing said medium until the backwash achieves a predetermined limit, means for adding a medium regenerate to said tank for regenerating said medium, rinsing means for rinsing said regenerate from said tank, control initiation means associated with each tank and operatively connected to the effluent detection means for each said tank, said control initiation means including a first circuit active gate element connected to the effluent quality detection means associated with each said tank, a first summating gate connected to each of said circuit active gate elements for combining signals from said first circuit active gate elements, sequencing means operatively connected to said summating gate for sequentially and continuously monitoring the effluent from each said tank, a regenerate level control operatively connected to the means for adding a medium regenerate, said regenerate level control being connected to said first summating gate, a second summating gate operatively connected to said sequencing means, timing means operatively connected to said second summating gate, a program advance gate operatively associated with said second summating gate, turbidity control means operatively connected to the means for backwashing said medium to monitor the turbidity of the backwash, means for measuring the pressure and the temperature of the backwash and adjusting the flow rate thereof based on the temperature and pressure to insure proper expansion of the purification medium, said turbidity control mechanism initiating a signal to said program advance gate based on the condition of the backwash through said medium, said regenerate control means deenergizing the means for adding a medium regenerate after a predetermined amount of medium regenerate has been added to a tank, said rinsing operating being controllable by said timing means, and a program advance mechanism operatively connected to said program advance gate for properly initiating the aforesaid operations.

References Cited
UNITED STATES PATENTS

| | | | |
|---|---|---|---|
| 2,338,667 | 1/1944 | Riche | 210—96 |
| 2,962,437 | 11/1960 | Lindsay | 210—35 |
| 3,101,316 | 8/1963 | Rose | 210—35 |
| 3,366,241 | 1/1968 | McMorris | 210—96 |

SAMIH N. ZAHARNA, Primary Examiner

U.S. Cl. X.R.
210—140, 190